United States Patent [19]
Ninham et al.

[11] Patent Number: 5,466,310
[45] Date of Patent: Nov. 14, 1995

[54] PRODUCTION OF METAL AND METALLOID NITRIDES

[75] Inventors: Barry W. Ninham, Cook; Andrzej Calka, Ainslie; James S. Williams, Holder, all of Australia

[73] Assignee: The Australian National University, Acton, Australia

[21] Appl. No.: 107,812

[22] PCT Filed: Feb. 19, 1992

[30] Foreign Application Priority Data

Feb. 19, 1991 [AU] Australia .................................. PK4679

[51] Int. Cl.$^6$ .................................................. B22F 1/00
[52] U.S. Cl. .............................. 148/513; 419/68; 419/61
[58] Field of Search ............................... 419/30, 32, 31, 419/34, 61, 68; 148/513

[86] PCT No.: PCT/AU92/00073

§ 371 Date: Aug. 18, 1993

§ 102(e) Date: Aug. 18, 1993

[87] PCT Pub. No.: WO92/14568

PCT Pub. Date: Sept. 3, 1992

[56] References Cited

U.S. PATENT DOCUMENTS

| | | | |
|---|---|---|---|
| 3,011,927 | 12/1961 | Zelezny | 148/126 |
| 3,459,546 | 8/1969 | Lambert | 75/205 |
| 3,615,380 | 10/1971 | Fichte et al. | 75/213 |
| 3,741,733 | 6/1973 | Kieffer | 29/182.5 |
| 3,880,600 | 4/1975 | Zboril | 29/182.5 |
| 3,904,448 | 9/1975 | Takahashi et al. | 148/105 |
| 4,063,938 | 12/1977 | Weissman | 75/205 |

FOREIGN PATENT DOCUMENTS

| | | |
|---|---|---|
| 59-97507 | 6/1984 | Japan . |
| 59-107908 | 6/1984 | Japan . |
| 60-43407 | 3/1985 | Japan . |
| 63-17210 | 1/1988 | Japan . |
| 63-96201 | 4/1988 | Japan . |
| 63-98106 | 4/1988 | Japan . |

OTHER PUBLICATIONS

Goetzel, C. G., "Treatise on Powder Metallurgy", vol. 1, 1949, pp. 1–5.
Metals Abstracts Annual Index, 1992, vol. 25, Part 1, 5–228, pp. 165–166.

Primary Examiner—Donald P. Walsh
Assistant Examiner—Daniel Jenkins
Attorney, Agent, or Firm—Harness, Dickey & Pierce

[57] ABSTRACT

A nitride of a metal or solid metalloid is produced by ball milling a powder of a metal or metalloid in a nitrogen, or nitrogen-containing atmosphere (such as ammonia). The pressure in the ball mill is normally from 100 to 5,000 kPa, typically about 300 kPa. The ball mill temperature may be from room temperature to 500° C., preferably from 200° C. to 400° C. The product powder is normally pressure moulded and annealed at 800° C. for about 1 hour to produce a strong, hard body. Controlling the degree of nitration, or mixing the product nitride powder with a metal powder before pressure moulding, enables a composite comprising a metal matrix with a dispersed nitride phase to be produced. An alternative technique, involves ball milling the metal or metalloid powder with an organic nitrogen-containing chemical which dissociates in the ball mill. This yields a mixture of the nitride and carbide of a metal or solid metalloid.

16 Claims, 2 Drawing Sheets

PRODUCTION OF METAL AND METALLOID NITRIDES

TECHNICAL FIELD

This invention concerns the production of metal and solid metalloid nitrides, and also the production of metallic composites in the form of a metal matrix with particles of a metal or metalloid nitride dispersed within the matrix. More particularly, it concerns the synthesis of metal and metalloid nitrides and composites of metal with a dispersed phase of a metal or metalloid nitride, using mechanical alloying techniques.

BACKGROUND

Nitrides of elemental metals and metalloids (such as silicon) are usually very hard materials with high temperature stability, high thermal conductivity and high corrosion resistance. They are used, inter alia, as abrasives and as additives which increase the strength and hardness of metals and alloys used as cutting tools.

Nitrides are difficult to synthesise. Usually they are produced by a chemical nitration reaction. However, such chemical nitration processes are generally expensive and invariably yield mixtures of nitrides, with uncertain properties. For example, in the chemical production of tungsten nitride, the product is usually a mixture of the nitrides $W_2N$ and WN. Similarly, molybdenum nitride production and iron nitride production usually yield mixtures of, respectively, $Mo_2N+MoN$, and $Fe_2N+Fe_4N$.

Using current chemical nitration processes, it is extremely difficult, if not impossible, to produce a composite material comprising a metal matrix material having within it a dispersed nitride phase (for example titanium and titanium nitride, Ti+TiN).

Another technique for producing metal nitrides involves a direct reaction between the metal and nitrogen at high temperature and pressure. In one implementation of this technique, metal powder is annealed in a nitrogen atmosphere at high temperatures (about 1500° C.) for a long time. Usually the nitrogen is caused to flow through the metal powder throughout this process. The main disadvantages of this technique are (i) the fact that many metals do not react with nitrogen directly, even at high temperatures, so that the use of this technique is limited; and (ii) in many instances, a "plug" of the nitride is formed at the nitrogen input side of the powder and this plug restricts the flow of nitrogen, thus preventing the formation of the metal nitride throughout the metal powder. Hence this technique (as is the case with the alternative techniques of ion nitriding, salt bath nitriding, and deposition nitriding) produces metals with nitride coatings rather than bulk metal nitrides.

DISCLOSURE OF THE PRESENT INVENTION

It is an object of the present invention to provide a new, relatively inexpensive, and reliable method of producing (a) metal and solid metalloid nitrides and (b) composites which consist of a matrix of metal or metal alloy having dispersed therein a quantity of a metal or metalloid nitride. To achieve this objective, a metal or solid metalloid powder is subjected to ball milling (preferably high intensity ball milling using a ball mill of the type described in the specification of International patent application No PCT/AU90/00471) in an atmosphere of nitrogen or in an atmosphere (such as ammonia) which contains nitrogen. The quantity of nitrogen in the ball mill is controlled to ensure that a required product is obtained (for example, a single phase consisting of a nitride, or a mixture of a metal and its nitride, or a single phase solid solution of a metal and its nitride). The nitrogen may be at atmospheric pressure but is preferably at a pressure in the range of from 1 atmosphere (approximately 100 kPa) to 50 atmospheres (approximately 5,000 kPa). However, the nitrogen pressure (that is, the pressure within the ball mill) may be higher than 50 atmospheres, an upper limit being about 1 MPa. The milling may be performed at room temperature or at elevated temperatures. The time required to produce a specific nitride will depend upon the metal or alloy to be nitrided, the pressure of nitrogen, the temperature at which the milling is performed, and the milling mode (that is, whether the milling is very high intensity milling or a relatively low energy milling).

Thus, according to the present invention, a method of forming a metal or metalloid nitride comprises subjecting a powder of the metal or metalloid to ball milling in an atmosphere of, or containing, nitrogen, for a period of time sufficient to ensure the production of a composition which contains a pre-determined proportion of the nitride of the metal or metalloid.

As noted above, the time required to produce the nitride composition will depend upon (i) the pressure of nitrogen in the ball mill (which will normally be in the range of from 100 kPa to 5,000 kPa), (ii) the temperature of the milling (which may be performed at room temperature but is preferably effected at an elevated temperature), and (iii) the energy of milling provided by the ball mill.

The product nitride composition, or mixture of metal and nitride, will be in powder form. This powder may be moulded to form a dense moulded mass, which is subsequently sintered to produce a solid nitride or metal/nitride composite body of high strength. If the product powder contains a high proportion of the nitride, it may be mixed with a metal (or alloy) powder, moulded, then sintered in an inert atmosphere to produce a two-phase composite body consisting of a metal (or alloy) matrix phase and a dispersed nitride phase.

It should be apparent from the above description of the present invention that a composite body comprising a metal matrix with particles of the metal nitride dispersed within the matrix may be formed by the method of the present invention, either (i) by ensuring that the quantity of nitrogen available in the ball mill is well below the quantity required to convert the entire charge of the mill into the metal nitride, or (ii) by ceasing the ball milling when the powder charge has been partially converted into the nitride.

If a particularly strong and dense composite body is required, a modified form of the present invention may be adopted. In this modified form of the invention, (i) the metal powder and nitrogen are milled in the ball mill until a nanostructural mixture (as defined later in this specification) is produced; (ii) the milling of the ball mill charge is stopped when the nanostructural mixture is formed; then (iii) the nanostructural mixture is moulded and sintered to produce the strong composite body.

In each instance above where reference is made to moulding a powder or a powder mixture, a known binder may be used with the powder or powder mixture when pressing the powder or mixture in a mould or die.

IMPLEMENTATION OF THE PRESENT INVENTION

In a first series of experiments to demonstrate the production of metal nitrides by the present invention, a ball mill with external magnets, of the type described in the specification of International patent application No PCT/AU90/00471 (and also in the paper by A Calka and J S Williams entitled "Synthesis of Nitrides by Mechanical Alloying", which was published in the *Proceedings of the International Symposium on Mechanical Alloying, 7 to 10 May 1991*, which was held in Kyoto, Japan), was used. A particular advantage of this type of ball mill is that it can be operated in a number of "modes", each mode providing a different energy transfer per impact of the balls within the chamber of the mill.

Using a ball mill of this type, nitrides were produced by ball milling a range of metal powders in a nitrogen atmosphere at room temperature. The powders used in this series of experiments were powders of aluminium, boron, iron, silicon, titanium, vanadium, tungsten, zirconium, cobalt, molybdenum, nickel, chromium, tantalum and magnesium. In each case the elemental powders had a purity of at least 98 per cent, and the particles in the powder had a size in the range of from 50 to 200 micrometers. During the milling, a constant pressure of high purity (99.99 per cent) nitrogen was maintained in the ball mill, and the progress of the milling was monitored by X-ray diffraction measurements using cobalt K$\alpha$ radiation. In some of the experiments, the product powders were pressed (moulded) to form pellets, and annealed in a vacuum at 800° C. for about 1 hour.

In the case of aluminium, the final product was a mixture of aluminium and aluminium nitride. Mixtures of the metal and its nitride were also obtained with titanium (the product being a mixture of Ti+TiN), vanadium (the product being a mixture of V+VN) and tungsten (the product being a mixture of W+$W_2$N+$W_3$N). When iron powder was milled in nitrogen, the product was a mixture of the metal and two nitrides (Fe+$Fe_2$N+$Fe_4$N), or a mixture of two iron nitrides ($Fe_4$N+$Fe_2$N), depending on the milling conditions.

Subsequent experiments conducted at elevated temperatures (up to 500° C.) showed that the rate of formation of nitrides was increased as the temperature of the reaction increased. Using the equipment available to the present inventors, the preferred temperature for the nitride production was a temperature in the range of from 200° C. to 400° C.

Increasing the pressure of nitrogen in the ball mill was also found to increase the rate of formation of the nitrides. The present inventors ascertained that using nitrogen at a pressure of about 300 kPa (about 3 atmospheres) enabled most of the nitriding reactions to be completed in (typically) 70 hours of milling, and that the increase in the reaction rate as a consequence of increasing the pressure of nitrogen was not a directly proportional relationship (the reaction rate tended to reach a substantially constant value when very high pressures of nitrogen—approaching 5,000 kPa—were used.

The present inventors also observed that, in general, operating the ball mill in the "high energy mode" resulted in a more rapid formation of the nitrides. However, it was found necessary to use very low energy milling, to prevent excessive cold welding, when producing nitrides of aluminium (AlN), copper ($Cu_3$N) and magnesium ($Mg_3N_2$).

In further experiments, the present inventors have milled metal powders in an atmosphere of ammonia ($NH_3$) to produce metal nitrides and (depending on the quantity of nitrogen present) mixtures of metal nitrides and unreacted metal. The ammonia dissociates in the course of the milling, but the hydrogen that is produced does not react with the metal powder in the ball mill.

The present inventors have also milled metal powders in organic chemicals containing nitrogen as a component, which dissociate in the course of the milling, to produce powders which are a mixture of the metal nitride and the metal carbide. Particularly suitable chemicals for this modification of the present invention have been tetracyanophenyl ($C_{48}H_{26}N_8$) and tetraphenylporphyrin ($C_{44}H_3N_4$). The hydrogen that is produced when such chemicals dissociate does not react with the metal powder.

In the course of monitoring the progress of milling metal powders in an atmosphere of nitrogen, it has been formed that, in almost every case, a nanostructural mixture is formed during the milling process. This nanostructural mixture has two structural components. One of these components comprises metal crystallites. The crystallites are separated by an interfacial component (the second component) which consists of metal nitride molecules. The size of the crystallites is such that the mixture has been termed a nanostructural mixture. It has been found that (as in the case of the nanostructural mixtures described in the specification of International patent application No PCT/AU91/00248) such nanostructural mixtures are particularly reactive. Pressing the nanostructural mixtures into moulds and annealing the moulded mixture at about 800° C. in vacuum or in an inert atmosphere yields composite bodies consisting of a metal nitride in solid solution in the metal. Such composite bodies have extreme hardness.

At present, the physical mechanisms involved in the present invention are not fully understood. The present inventors believe that surface induced dissociation of molecular nitrogen plays an important role. It is known (see the paper by G Broden et al, published in *Surface Science*, Volume 59, 1976, page 593) that if molecular nitrogen comes into contact with a clean metal surface, the nitrogen can dissociate. The rate of dissociation is strongly dependent upon the metal material and the surface condition. The atomic nitrogen produced from the dissociation is adsorbed by the metal much more rapidly than molecular nitrogen. The adsorbed atomic nitrogen then reacts with the metal. The adsorption rate of atomic nitrogen increases with temperature up to about 400° C., but at temperatures above about 400° C., desorption of the nitrogen may occur. The reaction rate between nitrogen and metals also increases with temperature. However, the role of near-surface defects and stresses in the adsorption and reaction processes are not yet understood.

It is believed that the milling of metal (and solid metalloid) powders generates a large number of new, rough, and presumably highly reactive, surfaces. The continual creation of such surfaces may substantially enhance the adsorption and reaction of nitrogen. It is known that, during the milling process, there is a locally increased temperature on impact, of up to 300° C. It is likely that this locally increased temperature acts to aid adsorption and the reaction between metal and nitrogen, and may also promote diffusion of nitrogen within the metal particles, thus ensuring a sub-surface supply of nitrogen in the metal particles. It is also possible that surface stress and plastic deformation of the metal (or metalloid) particles also plays a role in the successful bulk nitration process. What is apparent is that there must be strong driving forces operative during the milling process to account for the high degree of intermixing and the reaction that is observed to take place at such low temperatures.

To further illustrate the present invention, examples of the production of metal nitrides will now be described, with reference to the accompanying drawings.

Example 1

A sample of titanium powder was milled at room temperature in nitrogen in a ball mill of the type described in the specification of International patent application No PCT/AU90/00471, operated in the "high energy" milling mode. Samples of the milled powder charge were taken after the milling had progressed for 12 hours, 36 hours and 60 hours. X-ray diffraction patterns were obtained for each sample of milled powder, using cobalt Kα radiation, with the range of 2θ being from 10° to 110°.

After 60 hours of milling, the milling was stopped and most of the powder charge was pressed in a mould to form pellets of the product powder. The pellets were then annealed at 800° C. in vacuum for 1 hour. The X-ray diffraction pattern of one of the annealed pellets was also obtained.

Figure 1:
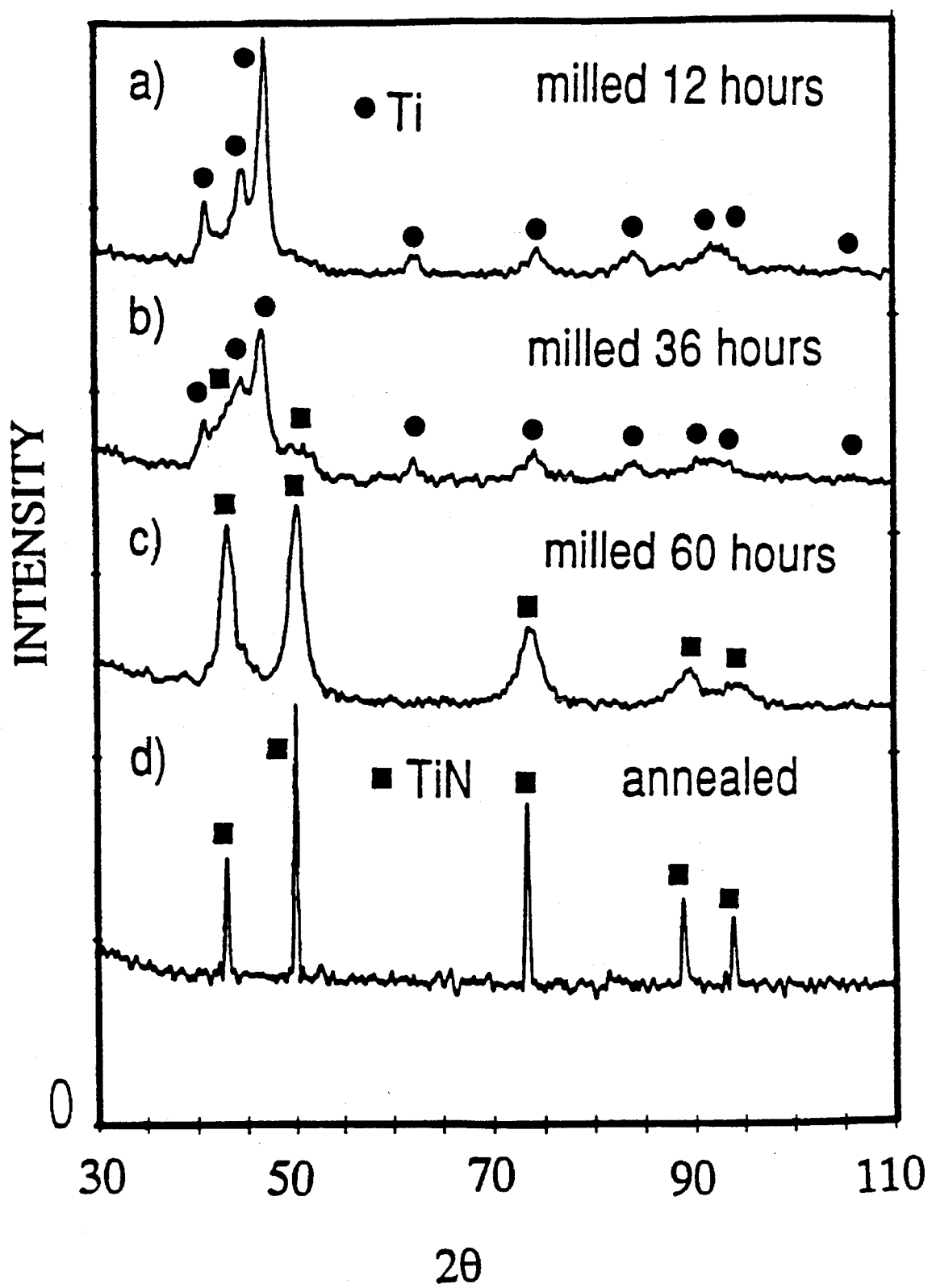
FIG. 1 is a series of X-ray diffraction patterns obtained during the milling of titanium powder in an atmosphere of nitrogen, and after subsequent compaction and annealing.

The X-ray diffraction patterns are shown, for each sample of milled powder and for the moulded and annealed material, in the conventional manner, in FIG. 1. The transformation from titanium to titanium nitride is clearly visible in this series of X-ray diffraction patterns. After 12 hours of milling, the Ti peaks have broadened, but only after 36 hours of milling is the presence of the TiN phase indicated. After 60 hours of milling, the fully developed structure of TiN is seen, the broadening of the peaks being due to the very fine grain size. Using the Scherrer formula, the grain size of the material milled for 60 hours was calculated to be 90 Angstrom units.

The X-ray diffraction pattern for the annealed material shows a full set of peaks for titanium nitride, with no residual titanium metal.

Example 2

Example 1 was repeated using (i) vanadium powder, and (ii) zirconium powder, in place of the titanium powder, and X-ray diffractograms were obtained periodically during the milling and after annealing (in vacuum or in an inert atmosphere—such as argon—at about 800° C.) of pellets of the powder product of the milling. Similar results to those for Example 1 were obtained for both vanadium and zirconium, although in each instance longer milling time was required to produce complete nitration of the metal powder.

Figure 2:
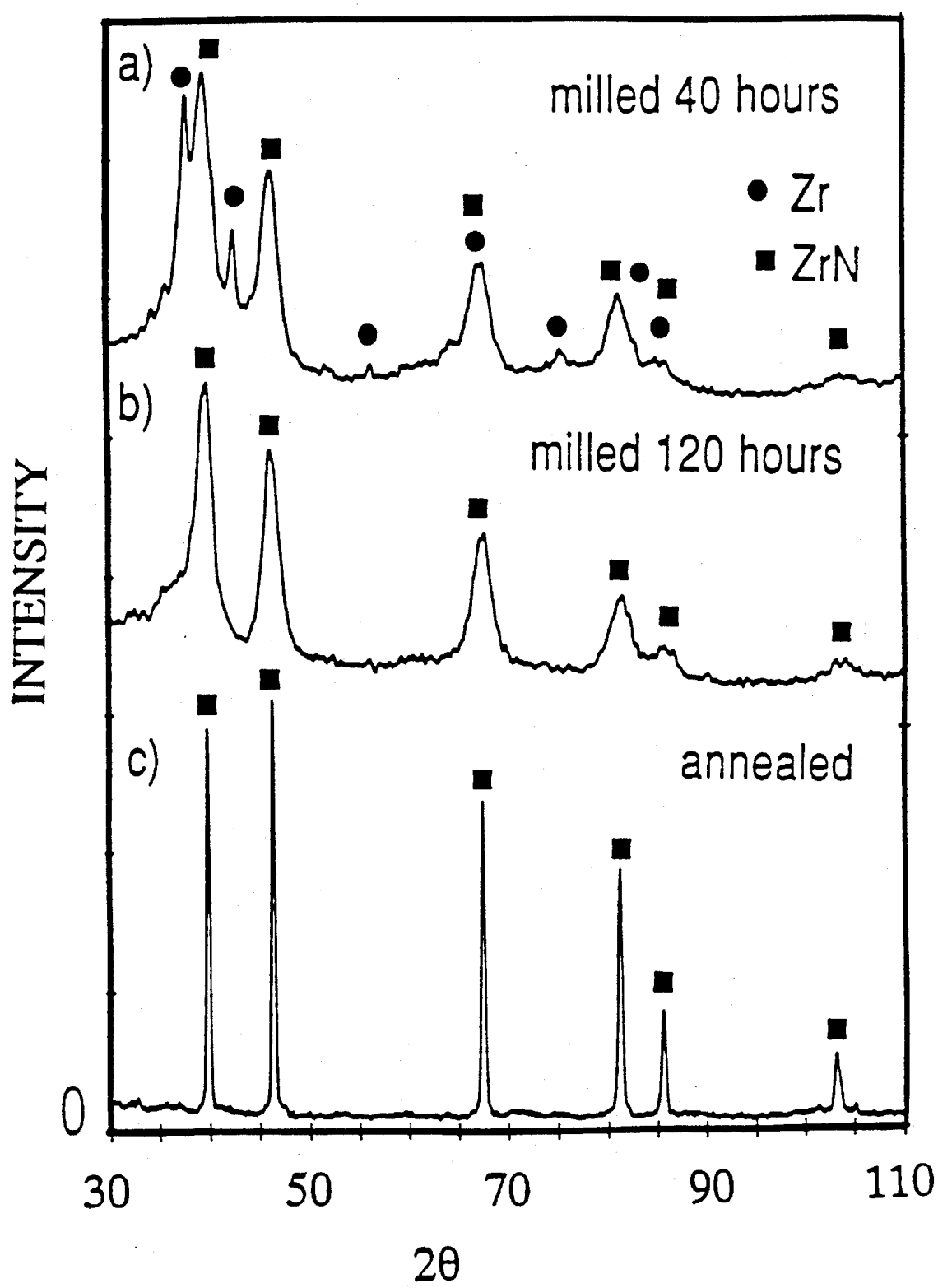
FIG. 2 is a series of X-ray diffraction patterns, similar to those of FIG. 1, for zirconium.

The X-ray diffractograms obtained from the zirconium powder after milling for 40 hours and 120 hours are shown in FIG. 2, together with the X-ray diffraction pattern obtained using the material of the annealed zirconium nitride pellets.

The results of other experiments conducted by the present inventors have been outlined in the above description of this invention.

Metallurgists and materials scientists will appreciate that although specific examples of the present invention have been described above, variations in the methods outlined in this specification may be made without departing from the present inventive concept.

We claim:

1. A method of forming a metal or metalloid nitride, said method comprising subjecting a powder of the metal or metalloid to ball milling in an atmosphere of, or containing, nitrogen for a period of time sufficient to ensure the production of a powder composition which contains a predetermined proportion of the nitride of the metal or metalloid.

2. A method as defined in claim 1, in which the atmosphere in the ball mill comprises nitrogen at a pressure in the range of from 100 kPa to 5,000 kPa.

3. A method as defined in claim 2, in which pressure of nitrogen is about 300 kPa.

4. A method as defined in claim 1, in which the atmosphere in the ball mill comprises ammonia at a pressure in the range of from 100 kPa to 5,000 kPa.

5. A method as defined in claim 4, in which the pressure of ammonia is about 300 kPa.

6. A method as defined in any preceding claim, in which the temperature within the ball mill is maintained in the range from room temperature to 500° C.

7. A method as defined in claim 6, in which the temperature within the ball mill is maintained in the range of from 200° C. to 400° C.

8. A method as defined in claim 1, in which the product of the method is a powder comprising substantially 100 per cent the nitride of the metal or metalloid, further characterised in that the product powder is pressure moulded, then annealed in vacuum or in an inert atmosphere, thereby producing a dense metal nitride body.

9. A method as defined in claim 1, in which the product of the method is a powder comprising substantially 100 per cent the nitride of the metal or metalloid, further characterised by the following steps:

(i) the product powder is mixed with a predetermined quantity of a powder of a second metal or a metal alloy;

(ii) the mixture of step (i) is pressure moulded; and (iii) the moulded material is annealed in vacuum or in an inert atmosphere; whereby a dense composite of the second metal and the nitride is produced.

10. A method as defined in claim 9, in which the nitride is a nitride of the second metal.

11. A method as defined in claim 1, further characterised in that (i) the milling is stopped when a nanostructural mixture, comprising crystallites of the metal or metalloid and an interfacial phase of the nitride of the metal or metalloid, is produced; and (ii) the nanostructural mixture is pressure moulded and annealed in vacuum or in an inert atmosphere;

whereby a dense body of a material comprising a solid solution of the nitride in the metal or metalloid is produced.

12. A method as defined in claim 8, in which the annealing of the moulded material is effected at a temperature of about 800° C. for a period of about 1 hour.

13. A method of forming a mixture of carbide and nitride of a metal or metalloid, said method comprising subjecting a powder of the metal or metalloid to ball milling with an organic chemical containing both carbon and nitrogen for a period sufficient to ensure the production of a powder composition which contains a pre-determined proportion of the carbide and nitride of the metal or metalloid.

14. A method as defined in claim 13, in which the chemical is tetracyanophenyl ($C_{48}H_{26}N_8$) or tetraphenylporphyrin ($C_{44}H_3N_4$).

15. A method as defined in claim 13, in which the product powder is pressure moulded, then annealed in vacuum or in an inert atmosphere, thereby producing a dense carbide/nitride body.

16. A method as defined in claim 15, in which the annealing is effected at a temperature of about 800° C. for a period of about 1 hour.

* * * * *

UNITED STATES PATENT AND TRADEMARK OFFICE
CERTIFICATE OF CORRECTION

PATENT NO. : 5,466,310
DATED : November 14, 1995
INVENTOR(S) : Barry W. Ninham; Andrzej Calka; James S. Williams It is certified that error appears in the above-indentified patent and that said Letters Patent is hereby corrected as shown below:

Col. 3, line 30, "TIN" should be --TiN--.

Col. 6, line 22, Claim 6: delete "any preceding claim" and insert --claim 1--.

Signed and Sealed this

Twenty-seventh Day of February, 1996

*Attest:*

BRUCE LEHMAN

*Attesting Officer*      *Commissioner of Patents and Trademarks*